(12) United States Patent
Roider et al.

(10) Patent No.: US 8,818,186 B2
(45) Date of Patent: Aug. 26, 2014

(54) LONG-RANGE OPTICAL DEVICE

(75) Inventors: Konrad A. Roider, Mils (AT); Herbert Hermann, Hall (AT)

(73) Assignee: Swarovski-Optik KG. (AT)

( * ) Notice: Subject to any disclaimer, the term of this patent is extended or adjusted under 35 U.S.C. 154(b) by 0 days.

(21) Appl. No.: 13/592,498

(22) Filed: Aug. 23, 2012

(65) Prior Publication Data

US 2013/0222983 A1  Aug. 29, 2013

(30) Foreign Application Priority Data

Aug. 24, 2011 (AT) ................................ A 1214/2011

(51) Int. Cl.
*G03B 17/48* (2006.01)

(52) U.S. Cl.
USPC .......................................................... 396/429

(58) Field of Classification Search
USPC .......................................................... 396/429
See application file for complete search history.

(56) References Cited

U.S. PATENT DOCUMENTS

| 3,201,742 | A | * | 8/1965 | English | 439/500 |
| 5,296,315 | A | * | 3/1994 | Rein | 429/100 |
| 7,794,272 | B1 | * | 9/2010 | Hiatt et al. | 439/500 |
| 7,795,574 | B2 | * | 9/2010 | Kennedy et al. | 250/214 VT |
| 2001/0028498 | A1 | | 10/2001 | Haga et al. | |
| 2003/0151660 | A1 | | 8/2003 | Hirunuma et al. | |
| 2003/0181226 | A1 | | 9/2003 | Kawata et al. | |
| 2004/0036966 | A1 | * | 2/2004 | Hirunuma et al. | 359/407 |
| 2004/0189247 | A1 | * | 9/2004 | Burman et al. | 320/112 |
| 2004/0263117 | A1 | | 12/2004 | Kogan et al. | |
| 2005/0001568 | A1 | | 1/2005 | Yokomori | |
| 2005/0128576 | A1 | * | 6/2005 | Perger et al. | 359/412 |
| 2006/0046779 | A1 | | 3/2006 | Tracy et al. | |
| 2009/0303457 | A1 | * | 12/2009 | Lancaster et al. | 356/5.01 |
| 2010/0060082 | A1 | | 3/2010 | Qu | |
| 2010/0220309 | A1 | | 9/2010 | Zhu et al. | |
| 2011/0081801 | A1 | * | 4/2011 | Chen | 439/500 |
| 2013/0090006 | A1 | * | 4/2013 | Huynh | 439/500 |

FOREIGN PATENT DOCUMENTS

| DE | 10115854 A1 | 10/2001 |
| DE | 10338668 A1 | 3/2004 |
| WO | 2010099732 A1 | 9/2010 |

* cited by examiner

*Primary Examiner* — Rodney Fuller
(74) *Attorney, Agent, or Firm* — Lerner, David, Littenberg, Krumholz & Mentlik, LLP

(57) ABSTRACT

A long-range optical device with at least one replaceable electrical energy storage device for supplying power to the long-range optical device, which energy storage device is disposed in a closable compartment of the device incorporating electrical contacts, wherein an adapter is provided which can be inserted in the compartment instead of the energy storage device, which is configured to run a data exchange with at least one other component, in particular a memory, of the long-range optical device. The long-range optical device can optionally be supplied with power by the adapter.

26 Claims, 3 Drawing Sheets

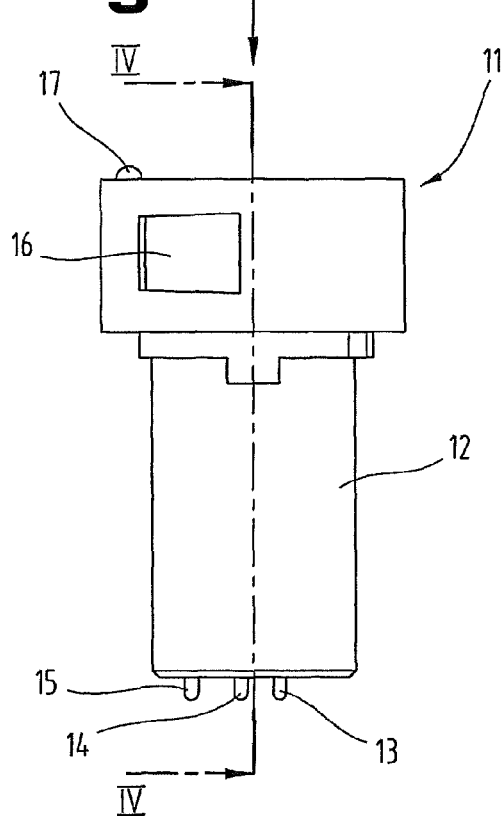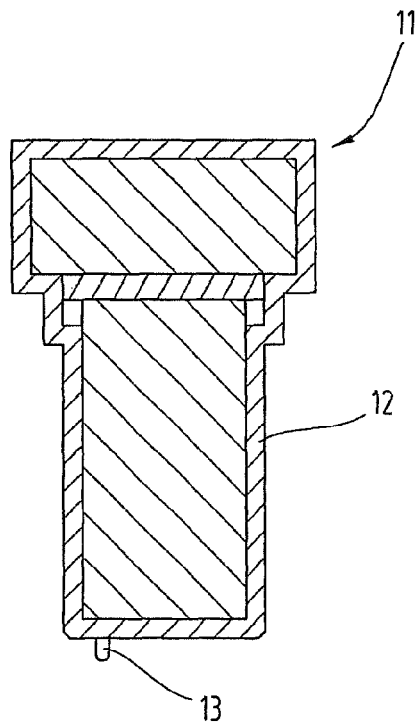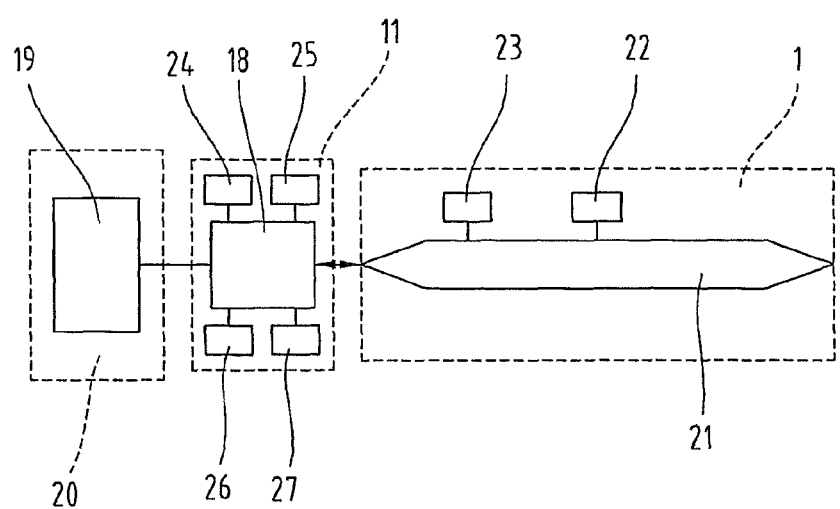

LONG-RANGE OPTICAL DEVICE

BACKGROUND OF THE INVENTION

The invention relates to a long-range optical device with at least one replaceable electrical energy storage device for supplying power to the long-range optical device, which energy storage device is disposed in a closable compartment of the device incorporating electrical contacts.

The invention further relates to an adapter for a connector for transmitting data of a long-range optical device.

The invention further relates to a method of operating a long-range optical device of the type outlined above with an adapter.

Another aspect of the subject matter of the invention is an interface for transmitting data of a long-range optical device.

By long-range optical device in this document is meant optical imaging systems which enable magnified imaging of objects situated at longer distances, such as binoculars, telescopes, optical sighting and direction-finding devices.

DE10338668A1 discloses a long-range optical device of the type outlined above in the form of a binocular telescope with a photographing function. The known telescope has a main housing part with a battery compartment. To enable image data to be read, an outer connector is provided on a printed circuit of a power supply unit, provided in the form of a hole in a wall of the main housing part so that an external data processing device can be connected.

The main disadvantage of the known device is that a data transmission has to take place via a relatively unprotected connector in the external wall of the main housing part. This connector is therefore protected against dirt and moisture to only a very limited degree. Another disadvantage of the known design resides in the fact that it is not possible to extend the range of functions of the long-range optical device.

BRIEF SUMMARY OF THE INVENTION

Accordingly, the objective of the invention is to guarantee that the data transmission connector is effectively and reliably protected from dirt and damage in the simplest possible way, whilst at the same time offering the possibility of being able to extend the range of functions of a long-range optical device in a simple way.

This objective is achieved on the basis of a device of the type outlined above, and an adapter is provided which can be inserted in the compartment instead of the energy storage device, and which is designed to enable a data exchange with at least one other component, in particular a memory, of the long-range optical device and/or by means of which the long-range optical device can be supplied with power.

The solution proposed by the invention offers a particularly simple way by means of which a connector disposed in the compartment of the energy storage device can be protected against moisture and other environmental influences when the long-range optical device is being used and a data exchange with the long-range optical device can be made easier by using an adapter. The range of functions of the long-range optical device can also be easily extended due to the adapter, for example due to software or data stored in the adapter.

Based on one advantageous variant of the invention, electrical contacts disposed in the compartment as a means of providing an electrical contact to the energy storage device are provided in the form of a data transmission connector between the adapter and the at least one controller and/or the at least one memory of the long-range optical device, and/or contacts for transmitting data are provided in the data transmission compartment which are different from the contacts for establishing an electrical contact. Based on this variant of the invention, both the electrical contacts for contacting the energy storage device and separate contacts for the data transmission as well as a combination of these contacts can be used to transmit data. This enables a data transmission connector to be provided in a simple manner and relatively cheaply.

The compartment may be sack-shaped and the data transmission connector may be disposed on a base part of the compartment. The advantage of this is that in a state in which the energy storage device is inserted, for example a battery, the data transmission connector is covered by the energy storage device and is therefore even better protected. Another advantage of this embodiment of the invention is that the data connector can easily be contacted by an appropriate adapter because the adapter merely has to be plugged into the compartment for this purpose.

Based on another embodiment of the invention, the device may have a bus system connected to the data transmission connector. Using the bus system means that individual electronic components of the device, such as for example a distance measuring device, a controller for setting shutter times and aperture sizes, a memory for storing image data, etc., can be activated by means of a common transmission route. The bus system and the internal data and settings of the device can be accessed via the data transmission connector. An external device accessing the bus system can provide write/red access to the bus, for example.

Based on another very advantageous embodiment of the invention, the data transmission connector may be provided in the form of a single-wire UART interface. The advantage of this is that, in addition to a ground wire, it is possible to manage with nothing more than a data wire which can be used both as a power supply and a transmitting and receiving line. This variant of the invention is therefore distinctive due to its relatively simple design. As an alternative to using a single-wire UART interface, the data transmission connector may also be provided in the form of a USB-connector based on another variant of the invention.

Based on one particularly practical variant of the invention which makes optimum use of the available fitting space, the compartment is provided in the form of a closable compartment disposed in a focusing knob of the long-range optical device.

In the case of a likewise very advantageous embodiment of the device proposed by the invention, the long-range optical device has a motor for changing focus settings, in particular for adapting diopters of the ocular. This makes for a very simple and comfortable way of adjusting the focus of the long-range optical device. Using a motor also means that wobbling of the long-range optical device is avoided when adjusting the focus, which can easily occur in the case of a manual adjustment.

In the case of one particularly practical variant which makes it possible to incorporate various extra functions of the long-range optical device, it is designed to run functions which are implemented in the adapter or as software or by means of at least one electronic circuit. For example, the adapter may be provided with software and/or hardware, by means of which the long-range optical device is able to run speed measurements and/or volume measurements on observed objects, for example. The adapter may be configured for an Optical Free Space Communication or as a distant station for a remote control device of the long-range optical device. The adapter may also be provided in the form of an accumulator pack or alternatively as a security dongle for the long-range optical device.

An adapter of the type outlined above is particularly suitable for use with the device proposed by the invention, which comprises at least one contact point for the connector of the long-range optical device and also at least one interface for connecting to an external data processing device and an essentially dimensionally stable housing with at least one guide surface for guiding the adapter on the long-range optical device during connection to the connector, and the adapter has a holding portion for gripping the adapter disposed behind the guide surface as viewed from the at least one contact point. By an "essentially dimensionally stable housing" in this context is meant a housing, the shape of which cannot be changed without breaking or the shape of which automatically resumes its original form when relieved of an external deformation force that has not broken the housing. Accordingly, materials which might be used for the housing other than metals and plastics are caoutchouc or rubber, for example. The dimensionally stable housing makes it much easier to contact a connector disposed in a recessed position in the long-range optical device because the contact point of the adapter can be correctly aligned with respect to the connector of the long-range optical device much more easily due to the dimensionally stable housing. Handling of the adapter is improved due to the guide surface, which is able to co-operate with side walls of a recess in which the connector is disposed.

In the case of another embodiment of the invention, at least part of the adapter can be inserted in a compartment of the long-range optical device which is provided as a means of accommodating an electrical energy storage device when the energy storage device has been removed and in the place of the energy storage device, and the guide surface is part of the surface of a part of the adapter which can be inserted in the compartment, and the at least one contact point for connecting to the data transmission connector of the long-range optical device is disposed on the part which can be inserted in the compartment. Using an adapter therefore offers an easy way of establishing a connection between the connector, disposed in the compartment of the device so that it is protected, and an external data processing device, for example a PC.

A particularly robust mechanical connection can be established between the device and the adapter due to the fact that the external contour of the part which can be inserted in the compartment corresponds to a negative shape of the compartment.

In the case of one embodiment of the adapter which is distinctive due to the fact that it enables contact to be established with a connector mounted on a base of the compartment, the at least one contact point is disposed on an end face of the part of the adapter which can be inserted in the compartment.

The adapter is easy to handle due to the fact that the adapter has a main body with an essentially T-shaped cross-section.

The adapter can be connected to the external data processing device in a particularly simple manner due to the fact that the interface of the adapter for connecting to the external data processing device is a USB-interface, in particular a mini USB interface.

Based on one variant of the invention which is distinctive due to the fact that there is no need for a plug-in connection between the interfaces for transmitting data, the interface for connecting to the external data processing device is a radio interface. The data transmission between the adapter and the external data processing device can therefore take place on the basis of a known radio network standard, such as Bluetooth, ZigBee, etc., for example. Alternatively, the adapter may also be provided in the form of an infrared interface in order to run the data exchange with the external data processing device.

In the case of another embodiment of the adapter proposed by the invention, the contact point for connecting to the data transmission connector of the long-range optical device is provided in the form of a single-wire UART interface.

Damage to the adapter and the long-range optical device due to the effect of force can be prevented due to the fact that a mechanical connection is established between the contact point of the adapter and the connector in the form of a non-destructive separation point.

Data can be permanently stored on the adapter, for example updates for firmware of the long-range optical device, due to the fact that it has a writeable and readable mass memory for connecting to the external data processing device and the data transmission connector via the interface. In this manner, an internal memory of the long-range optical device can be extended by means of the memory of the adapter.

In order to display to a user at least the connection status between the contact point of the adapter and the connector of the device, the adapter may have at least one optical status display.

The adapter may also have an optical display for displaying information and control elements. This makes it easier for the user to operate the adapter. The display may also be provided in the form of a touchscreen, in which case the control elements may be integrated in the display.

The functions of the long-range optical device can be extended in a simple manner due to the fact that the adapter has a GPS receiver and/or an electronic compass and/or an inclination sensor and/or at least one sensor for detecting at least one variable for an environmental state, such as temperature, air pressure and air humidity. By using adapters with different hardware and/or software functions, different add-on functions can be specially adapted to customer requirements.

The device proposed by the invention and the associated adapter proposed by the invention may be used in a particularly advantageous way based on a method of the type outlined above whereby after correctly inserting the adapter in the long-range optical device, a controller of the adapter receivers a status report, whereupon the device is either placed in a boot mode or in an operating mode by a controller of the adapter or by a controller of an external data processing device, and either the controller of the adapter or the controller of the external data processing device acts as master for the long-range optical device. In this manner, both software updates stored on the adapter itself and data can be exchanged on the long-range optical device between the device and the adapter or the external data processing device. For example, based on one advantageous variant of the method proposed by the invention, data stored in a memory of the long-range optical device can be read via the adapter, in particular image data recorded by the device.

Based on another very advantageous variant of the method proposed by the invention, user-defined parameter values stored in a memory of the adapter can be transmitted via the adapter to a memory of the device and the device configured in accordance with the user-defined parameter values. On the basis of the user-defined parameter values, for example parameter values pertaining to physiological properties of the user, such as eye distance, focus settings adapted to eyesight, etc. and/or parameter values pertaining to the user's preferred program settings, the long-range optical device can be easily placed in the desired user-defined operating mode when switched on by the relevant user.

Storing user-defined device settings on the adapter is of particular advantage because a user merely has to plug his adapter into a long-range optical device proposed by the invention and the settings needed for the user can be configured on a totally automatic basis. This significantly improves comfort in terms of operation.

In the case of another advantageous embodiment of the invention, identification data of at least one user stored in a memory of the long-range optical device is compared with identification data of a user stored in the adapter, and access to data stored in the device and/or copying of data to the device by the adapter is not granted unless there is a match of identification data stored in the adapter and in the device. This variant of the invention enables the long-range optical device to be assigned to a specific user so that only he can access the data stored in the long-range optical device. The long-range optical device can be assigned to the user by the seller already before use. The identification data, for example, might be biometric data of the user, for example a fingerprint etc., or alternatively a pre-definable code stored in both the device and the adapter. This embodiment also enables the device to be specifically adapted to a user, in which case changes to the user-defined settings of the device can only be made on the basis of the matching, i.e. corresponding, identification data or a corresponding administrator adapter incorporating the corresponding authorization.

For the purposes of the invention, an interface for transmitting data from a long-range optical device may comprise a compartment used to accommodate an electrical energy storage device in which a connector for a data transmission is disposed and an adapter proposed by the invention.

Based on another advantageous embodiment of the invention which is distinctive due to the effective protection afforded to the connector of the long-range optical device and its simple contacting by the adapter, the data transmission connector is disposed on a base of the compartment lying diametrically opposite an insertion orifice for the energy storage device.

To provide a clearer understanding, the invention will be described in more detail below with reference to the appended drawings.

BRIEF DESCRIPTION OF THE DRAWINGS

These are schematically simplified diagrams respectively illustrating:

FIG. 3 an adapter proposed by the invention, to be inserted in the compartment illustrated in FIG. 2;

FIG. 4 a section along line IV-IV through the adapter illustrated in FIG. 3;

FIG. 5 a block diagram of the device proposed by the invention with an adapter and an external data processing device;

DETAILED DESCRIPTION

Figure 1:
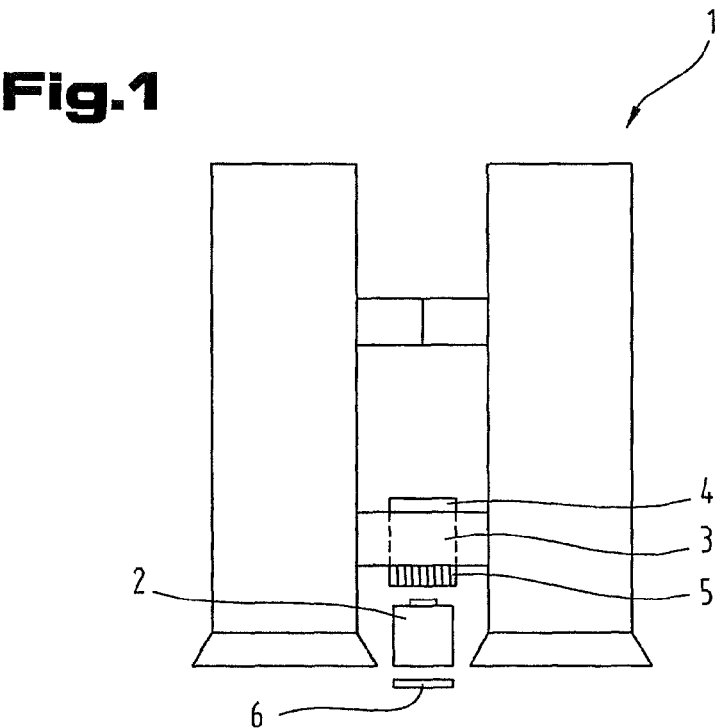
FIG. 1 a partially exploded view of a long-range optical device proposed by the invention seen in a plan view.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

As illustrated in FIG. 1, a long-range optical device 1 proposed by the invention, for example binoculars, a telescope, etc. comprises at least one replaceable electrical energy storage device 2, for example a battery, for supplying power to the long-range optical device 1. The device 1 has consumers internally powered by the energy storage device 2, for example a distance measuring device, night vision devices, a device controller etc. In particular, the device may have one or more memories for recording data. A bus system denoted by reference number 21 in FIG. 5 may also be provided in the device 1.

The energy storage device 2 is disposed in a closable compartment 3 of the device 1 containing electrical connections. The compartment 3 may be closed by means of a cover 6. It may be preferable for the cover 6 to be screwed to the compartment 3.

A connector 4 for transmitting data to an external data processing device denoted by reference number 20 in FIG. 5 may be provided in the compartment 3. The connector 4 may be connected to the bus system of the device 1.

The compartment 3 may be shaped in the form of a sack and the connector 4 for transmitting data may be disposed on a base part of the compartment 4. More specifically, the connector 4 for transmitting data may be disposed on a base of the compartment 3 lying diametrically opposite an insertion orifice for the energy storage device 2.

As may also be seen from FIG. 1, the compartment 3 may be disposed directly in an operating element 5 for influencing an optical control variable. The energy storage device 2 may therefore be disposed in the operating element 5. The operating element 5 may be an adjusting ring for zooming, example. Most preferably, the compartment 3 is provided in the form of a closable compartment in a focusing knob of the long-range optical device.

If the energy storage device 2 is disposed in the operating element 5 or in the focusing knob itself, it is possible to provide an inventive solution in its own right even without disposing the connector 4 for transmitting data there. For example, the focusing knob may be of a two-part design and may comprise a cover and a holder for the energy storage device 2. The holder may be provided in the form of a cylindrical hollow body and may be closed by means of the cover, which may likewise be cylindrical. The cover and holder may have complementary threads in order to provide a fixed connection for the focusing knob. Alternatively, the cover and focusing knob may be connected to one another by a bayonet fitting. At this stage, it should be pointed out that other types of connection which prevent the cover from being detached from the holder when the focusing knob is operated are also possible. The advantage of the embodiments just described is that the battery can be easily removed from the focusing knob and replaced. Disposed in the focusing knob are contacts for establishing an electrical contact with the energy storage device 2 or battery. The electrical contacts for the battery may be disposed extending from the focusing knob in the radial and/or axial direction. The contacts themselves may be wires or pad-type structures made from conductive materials.

The focusing knob may be dimensioned so that the battery, for example in the form of a button battery or cylindrical cell, is accommodated in its interior with essentially no clearance. Damping elements may also be provided in the focusing knob, for example made from rubber or some other elastomeric material, in order to prevent the focusing knob from being damaged by the battery in the event of impact. At least one seal element may also be provided between the cover and holder, for example in the form of an O-ring, in order to guarantee protection from water or dirt. At this stage, it should be pointed out that instead of a single energy storage device 2 or a single battery, it would also be possible to provide several energy storage devices 2 or batteries in the focusing knob or operating element 5.

Figure 2:
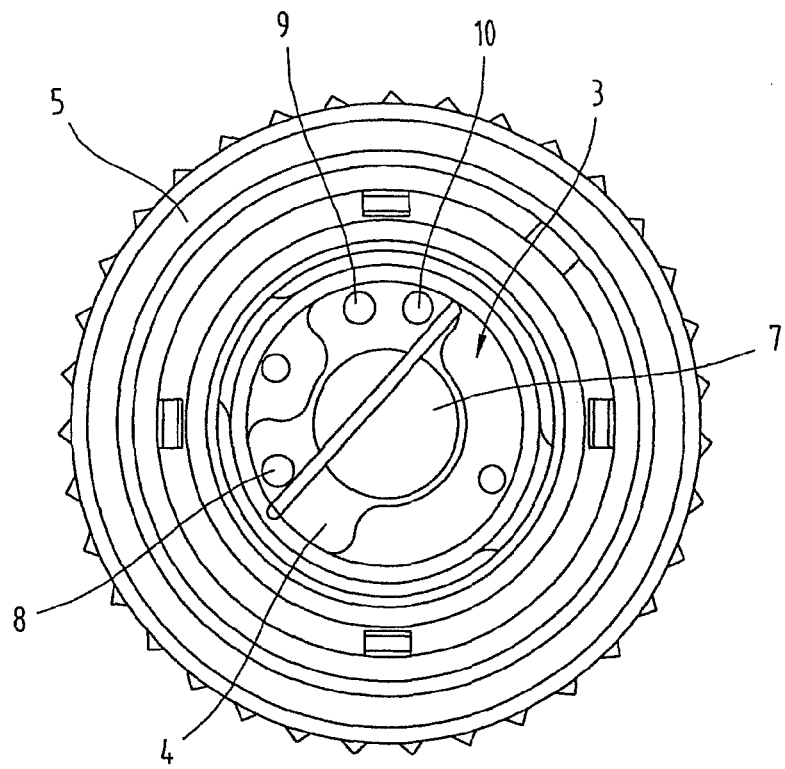
FIG. 2 a plan view of an opened compartment for accommodating an electrical energy storage device of the long-range optical device illustrated in FIG. 1.

As illustrated in FIG. 2, it may be preferable to provide the connector 4 for transmitting data in the form of a single-wire UART interface. In the case illustrated, the connector 4 has one contact point 7 for a current-carrying wire, which may also be used for transmitting data, and one contact point 8 for a ground. In addition to contact points 7 and 8, yet other contact points 9, 10 may be provided, depending on the embodiment. As an alternative to the option where the connector 4 is a single-wire UART interface, the connector 4 may also be provided in the form of a USB-interface. At this stage, it should be pointed out, however, that the connector 4 may also be provided in the form of data transmitting data interfaces other than the ones specifically mentioned here.

After removing the energy storage device 2 from the compartment 3, an adapter 11 proposed by the invention and illustrated in more detail in FIG. 3 may be inserted in it instead of the energy storage device. The compartment 3 incorporating the connector 4 and adapter 11 thus form an interface for transmitting data of the long-range optical device 1. The adapter 11 is configured for exchanging data with at least one controller and/or at least one memory of the long-range optical device. Based on one variant of the invention, the long-range optical device can be supplied with power via the adapter. For example, the adapter may have an internal battery or accumulator for supplying power to the long-range optical device and/or serve as an interface to an external power supply. The adapter is preferably provided in the form of an accumulator pack with a charging plug. However, power may also be supplied to the long-range optical device by connecting the adapter to a USB-interface of a computer or another external power source, for example.

As illustrated in FIG. 3, the adapter 11 has a dimensionally stable housing with at least one guide surface for guiding the adapter 11 on the long-range optical device 1 when a connection is being established with the connector 4. The external shape of the adapter 11 may therefore be defined by the dimensionally stable housing. The guide surface in the case of the variant of the invention illustrated here is formed by a part 12 which can be inserted in the compartment 3. The adapter 11 may also have contact points 13, 14, 15 disposed on the part 12 which can be inserted in the compartment 3 for connecting to the connector 4 for transmitting data and an interface 16 for connecting to the external data processing device denoted by reference 20 in FIG. 5. The interface 16 is preferably provided in the form of a USB interface, in particular a mini USB interface, although other appropriate interfaces could be used in principle, such as radio or infrared interfaces for establishing a wireless communication.

As may also be seen from FIG. 3, both the contact points 13, 14, 15 and the interface 16 to the external data processing device 20 may be disposed on the dimensionally stable housing of the adapter 11.

As may be seen from a comparison of FIGS. 2 and 3, the external contour of the part 12 of the adapter 11 which can be inserted in the compartment 3 is congruent with the shape of the compartment 3. Based on this embodiment, the part 12 therefore corresponds to a shape that is the negative of the compartment 3.

As may be seen from FIG. 4 in addition to FIG. 3, the adapter 11 may comprise a main body with an essentially T-shaped cross-section. Adjoining the part 12 which can be inserted in the compartment 3 is a head projecting laterally out from this part. The head may be disposed outside the compartment in the state in which the adapter 11 is inserted in the compartment 3. A bottom edge of the head may lie against a top edge of the compartment 3 and terminate the latter. The head lies behind the guide surface as viewed from the contact points 13, 14, 15, i.e. behind the part 12, and simultaneously constitutes a holding portion for gripping the adapter 11. At this stage, it should be pointed out that the head need not necessarily constitute the holding portion. Instead, the holding portion may also be provided in the form of a loop or by nothing more than a part projecting out from the compartment 3 when the adapter 11 is in the fitted state, which can therefore be gripped and is of any shape.

For the purpose of facilitating access, the interface 16 may be disposed on the head or on the holding portion of the housing, as illustrated in FIG. 3.

As may also be seen from FIGS. 3 and 4, the contact points 13, 14, 15 may be disposed on an end face of the part 12 of the adapter 11 which can be inserted in the compartment 3. If the connector 4 of the long-range optical device is designed accordingly, the contact points 13, 14, 15 may be part of a single-wire UART interface. In this embodiment of the invention, electrical contacts provided in the compartment 3 for establishing an electrical contact with the energy storage device 2 may also be used as a connector 4 for transmitting data between the adapter and the at least one controller and/or the at least one memory of the long-range optical device.

A connection between the at least one contact point 13, 14, 15 of the adapter 11 and the connector 4 may be provided in the form of a non-destructive separation point. The non-destructive separation point may be achieved by means of permanent magnets and co-operating counter-elements of metal or magnets of reverse polarity disposed in the compartment 3 adjacent to the contact points 13, 14, 15, for example. When a retaining force generated by the magnets and opposing the latter is overcome, the connection can be released without causing any mechanical damage to the interface.

Figure 6:
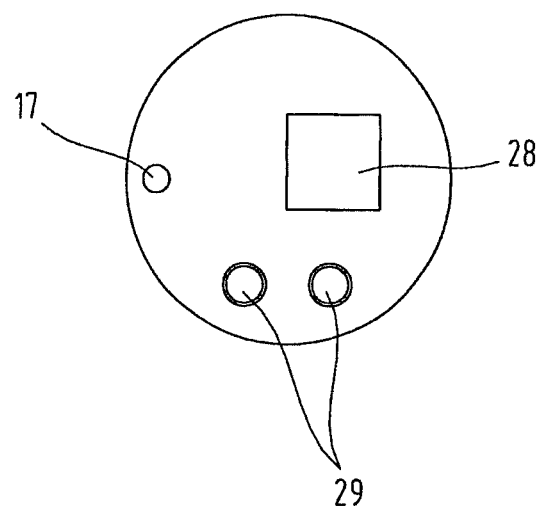
FIG. 6 a plan view of the adapter illustrated in FIG. 3 from direction VI.

As may be seen from FIG. 3, the adapter may have an optical status display 17, for example in the form of one or more LEDs. This enables a connection status between the contact points 13, 14, 15 of the adapter 11 and the connector 4 of the device 1 to be displayed. A user is therefore able to see in a simple manner if there is a faulty function or an active data transmission between the adapter 11 and the device 1, for example. The adapter may also have an optical display for displaying information and corresponding control elements which enable a user to make inputs. This display is preferably disposed on a front end face of the adapter 11 directed towards the user in the fitted state. FIG. 6 shows a plan view of the front face of the adapter 11, reference number 28 being used to denote the optical display and reference number 29 being used to denote the control elements, which may be provided in the form of push-buttons, for example.

The adapter 11 may also have a GPS receiver and/or an electronic compass and/or an inclination sensor and/or at least one sensor for detecting a variable of at least one environmental state such as temperature, air pressure and air humidity. This provides an easy way of extending the range of functions of the long-range optical device with the aid of the adapter 11.

As illustrated in FIG. 5, a method proposed by the invention for operating the long-range optical device 1 with the adapter 11 once the adapter 11 has been correctly inserted in the long-range optical device 1 is such that a controller 18 of the adapter 11 receives a corresponding status report from the device 1. The controller 18 may be configured as an appropriately programmed microprocessor, for example. As a result, the device 1 may be placed either in a boot mode or in an operating mode by the controller 18 of the adapter 11 or by a controller 19 of the external data processing device 20 which may optionally be connected to the adapter 11. In this respect, either the controller 18 of the adapter 11 or the controller 19 of the external data processing device 20 may operate as master for the bus system 21 of the long-range optical device 1.

Data stored in a memory 22 of the long-range optical device 1, in particular image data recorded by the device 1, can then be read via the adapter 11. Furthermore, user-defined parameter settings stored in a memory of the adapter 11 can then be transferred via the adapter 11 to the memory 22 of the device 1. The device 1 can then be configured on the basis of the user-defined parameter settings or parameter values. This may be handled by a controller of the device 1, for example. This controller may activate motors of the device 1 for example, which move elements of the device 1 into the appropriate position. For example, the distance between a right and left ocular of a pair of binoculars can be automatically adjusted on the basis of the parameter values.

The device 1 may also have a motor 23, which sets focus settings, in particular a focus setting of the device 1, on the basis of values stored in the adapter 11. For example, an ocular lens of an optical system of the device 1 may be moved in accordance with the stored values, for example the user's diopter values, by means of the motor 23. In this manner, once the adapter 11 has been plugged into the device 1, the device 1 is automatically adapted to the user's eyesight.

Identification data of at least one user may also be stored in the memory 22 of the long-range optical device 1. This identification data may be compared with a user's identification data stored in the adapter 11 after the adapter 11 has been plugged into the device 1. Access to data stored in the device 1, for example recorded image data, and/or copying of data to the device 1 by means of the adapter 11 is preferably not possible unless identification data stored in the adapter 11 and in the device 1 matches.

As already mentioned above, the adapter 11 may also have additional components and sensors, for example such as a GPS receiver 24 and/or an electronic compass 25 and/or an inclination sensor 26 and/or at least one sensor 27 for detecting at least one variable for an environmental status such as temperature, air pressure and air humidity. The data obtained by means of these additional components and sensors can be recorded in the memory 22 or in an internal memory of the adapter 11. The device 1 may also be operated taking account of the additional data. For example, a ballistics program running in the device 1 or adapter 11 may compute a misfire on the basis of distance, inclination and optionally air pressure, air humidity and temperature, and output a corrected distance or a displacement of an elevation turret of the device 1 if the latter is designed as a sighting telescope.

The embodiments illustrated as examples represent possible variants of the device proposed by the invention and the adapter proposed by the invention, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the structure of the device proposed by the invention and the adapter proposed by the invention, they and their constituent parts are illustrated to a certain extent out of scale and/or on an enlarged scale and/or on a reduced scale.

LIST OF REFERENCE NUMBERS

1. Long-range optical device
2. Energy storage device
3. Compartment
4. Connector
5. Operating element
6. Cover
7. Contact for data wire
8. Contact for ground
9. Contact
10. Contact
11. Adapter
12. Part
13. Contact point
14. Contact point
15. Contact point
16. Interface
17. Status display
18. Controller
19. Controller
20. Data processing device
21. Bus system
22. Memory
23. Motor
24. GPS receiver
25. Electronic compass
26. Inclination sensor
27. Sensor
28. Optical display
29. Control elements

The invention claimed is:

1. A long-range optical device, comprising:
   at least one replaceable electrical energy storage device for supplying power to the long-range optical device, which energy storage device is disposed in a closable compartment of the device incorporating electrical contacts, wherein an adapter is provided which can be inserted in the compartment instead of the energy storage device, the adaptor being configured to run a data exchange with at least one other component, the at least one other component including a memory, of the long-range optical device.

2. The long-range device according to claim 1, wherein electrical contacts provided in the compartment for establishing an electrical contact of the energy storage device are provided as a connector for transmitting data between the adapter and the at least one controller and/or the at least one memory of the long-range optical device, and/or data transmitting contacts are provided in the compartment for transmitting data which are different from the contacts for establishing an electrical contact.

3. The long-range optical device according to claim 2, wherein the compartment is sack-shaped and the connector for transmitting data is disposed on a base part of the compartment.

4. The long-range optical device according to claim 3, wherein the device has a bus system connected to the connector.

5. The long-range optical device according to claim 2, wherein the connector is provided in the form of a single-wire UART interface.

6. A long-range optical device, comprising: at least one replaceable electrical energy storage device for supplying power to the long-range optical device, which energy storage device is disposed in a closable compartment of the device incorporating electrical contacts, wherein an adapter is provided which can be inserted in the compartment instead of the energy storage device, the adaptor being configured to run a data exchange with at least one other component, the at least one other component including a memory, of the long-range optical device and/or by means of which the long-range optical device can be supplied with power, wherein the compartment is a closable compartment disposed in a focusing knob of the long-range optical device.

7. The long-range optical device according to claim 1, further comprising a motor for changing focus settings of the long-range optical device.

8. The long-range optical device according to claim 1, wherein the long-range optical device is configured to run functions, the functions including speed measurements, volume measurements, Optical Free Space Communication, remote control, security dongle, which are implemented as software in the adapter or by means of at least one electronic circuit, or the adapter is designed as an accumulator pack.

9. An adapter for a connector for transmitting data of a long-range optical device, the adapter comprising:
at least one contact point for the connector of the long-range optical device;
at least one interface for connecting to an external data processing device;
an essentially dimensionally stable housing with at least one guide surface for guiding the adapter on the long-range optical device whilst the connection to the connector is being established; and
a holding portion for gripping the adapter which is disposed behind the guide surface as viewed from the at least one contact point,
wherein the adapter further comprises a main body with an essentially T-shaped cross-section.

10. The adapter according to claim 9, wherein the adapter is disposed at least partially in a compartment of the long-range optical device provided as a means of accommodating an electrical energy storage device in which it can be inserted after removing the energy storage device and instead of the energy storage device, and the guide surface is part of the surface of a part of the adapter which can be inserted in the compartment, and which has at least one contact point for connecting to the connector for transmitting data of the long-range optical device disposed on the part which can be inserted in the compartment.

11. The adapter according to claim 10, wherein the external contour of the part which can be inserted in the compartment has a shape corresponding to the negative of the compartment.

12. The adapter according to claim 10, wherein the at least one contact point is disposed on an end face of the part of the adapter which can be inserted in the compartment.

13. The adapter according to claim 9, wherein the interface for connecting to the external data processing device is a USB interface.

14. The adapter according to claim 9, wherein the at least one contact point for connecting to the connector for transmitting data of the device is provided in the form of a single-wire UART interface.

15. The adapter according to claim 9, further comprising a mechanical connection to the connector in the form of a non-destructive separation point.

16. A method of operating a long-range optical device with an adapter according to claim 9, the method comprising:
inserting the adapter in to a compartment for an energy storage device of the long-range optical device;
obtaining a status report of the adapter via a controller, whereupon the device is either placed in a boot mode or an operating mode by a controller of the adapter or by a controller of an external data processing device; and
either the controller of the adapter or the controller of the external data processing device acts as master for the long-range optical device.

17. The method according to claim 16, wherein data stored in a memory of the long-range optical device is read via the adapter, wherein the data includes image data recorded by the device.

18. The method according to claim 16, wherein user-defined parameter settings stored in a memory of the adapter are transferred via the adapter into a memory of the device and the device is configured on the basis of the user-defined parameter values.

19. The method according to claim 16, wherein identification data of at least one user stored in a memory of the long-range optical device is compared with identification data of a user stored in the adapter, and access to data stored in the device and/or copying of data to the device by means of the adapter is not permitted unless there is a match between identification data stored in the adapter and in the device.

20. An interface for transmitting data of a long-range optical device, wherein the interface is formed by a compartment used to accommodate an electrical energy storage device in which a connector for a data transmission is disposed, and an adapter according to claim 9.

21. The interface according to claim 20, wherein the connector for transmitting data is disposed on a base of the compartment diametrically opposite an insertion orifice for the energy storage device.

22. An adapter for a connector for transmitting data of a long-range optical device, the adapter comprising:
at least one contact point for the connector of the long-range optical device;
at least one interface for connecting to an external database processing device;
an essentially dimensionally stable housing with at least one guide surface for guiding the adapter on the long-range optical device whilst the connection to the connector is being established; and
a holding portion for gripping the adapter which is disposed behind the guide surface as viewed from the at least one contact point,
wherein the interface for connecting to the external data processing device is a radio or infrared interface.

23. An adapter for a connector for transmitting data of a long-range optical device, the adapter comprising:
at least one contact point for the connector of the long-range optical device;
at least one interface for connecting to an external database processing device;

an essentially dimensionally stable housing with at least one guide surface for guiding the adapter on the long-range optical device whilst the connection to the connector is being established;

a holding portion for gripping the adapter which is disposed behind the guide surface as viewed from the at least one contact point, and a writeable and readable mass memory which can be connected via the interface to the external data processing device and the connector for transmitting data.

24. An adapter for a connector for transmitting data of a long-range optical device, the adapter comprising:

at least one contact point for the connector of the long-range optical device;

at least one interface for connecting to an external database processing device;

an essentially dimensionally stable housing with at least one guide surface for guiding the adapter on the long-range optical device whilst the connection to the connector is being established;

a holding portion for gripping the adapter which is disposed behind the guide surface as viewed from the at least one contact point, and at least one optical status display in order to display at least the connection status between the at least one contact point of the adapter and the connector of the device.

25. An adapter for a connector for transmitting data of a long-range optical device, the adapter comprising:

at least one contact point for the connector of the long-range optical device;

at least one interface for connecting to an external database processing device;

an essentially dimensionally stable housing with at least one guide surface for guiding the adapter on the long-range optical device whilst the connection to the connector is being established;

a holding portion for gripping the adapter which is disposed behind the guide surface as viewed from the at least one contact point, and an optical display for displaying information and/or control elements.

26. An adapter for a connector for transmitting data of a long-range optical device, the adapter comprising:

at least one contact point for the connector of the long-range optical device;

at least one interface for connecting to an external database processing device;

an essentially dimensionally stable housing with at least one guide surface for guiding the adapter on the long-range optical device whilst the connection to the connector is being established;

a holding portion for gripping the adapter which is disposed behind the guide surface as viewed from the at least one contact point, and at least one of a GPS receiver, an electronic compass, an inclination sensor, and at least one sensor for detecting at least one variable for an environmental state, the at least one variable including at least one of temperature, air pressure and air humidity.

\* \* \* \* \*